United States Patent
Sitnikov

(10) Patent No.: US 8,708,308 B2
(45) Date of Patent: Apr. 29, 2014

(54) SEALING ARRANGEMENT FOR A DIAPHRAGM VALVE

(75) Inventor: Timofey Sitnikov, Lititz, PA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 332 days.

(21) Appl. No.: 12/851,043

(22) Filed: Aug. 5, 2010

(65) Prior Publication Data

US 2011/0031427 A1 Feb. 10, 2011

Related U.S. Application Data

(60) Provisional application No. 61/231,472, filed on Aug. 5, 2009.

(51) Int. Cl.
*F16K 1/00* (2006.01)
*F16K 31/00* (2006.01)

(52) U.S. Cl.
USPC ............. 251/331; 251/61.5; 251/335.2

(58) Field of Classification Search
USPC .......... 251/331, 335.2, 61–61.5; 92/99, 100
See application file for complete search history.

(56) References Cited

U.S. PATENT DOCUMENTS

| 3,659,625 | A | * | 5/1972 | Coiner et al. | 137/204 |
| 4,171,792 | A | * | 10/1979 | Bass | 251/335.2 |
| 4,993,925 | A | * | 2/1991 | Becker et al. | 417/413.1 |
| 6,508,266 | B2 | * | 1/2003 | Iritani et al. | 137/312 |
| 2006/0152001 | A1 | * | 7/2006 | Matsuhashi et al. | 285/339 |

OTHER PUBLICATIONS

Grafoil GHE Metal_Reinforced Laminate, Technical Data Sheet 131 http://graftechaet.com/getattachment/81b03688-90ae-4094-8636-93989143d83c/Typical-Properties—GRAFOIL-Grade-GHE.aspx, dated Jun. 20, 2013.*

* cited by examiner

*Primary Examiner* — John K Fristoe, Jr.
*Assistant Examiner* — Michael R Reid
(74) *Attorney, Agent, or Firm* — RatnerPrestia

(57) ABSTRACT

A diaphragm valve is disclosed. The diaphragm valve includes a valve body including a housing defining a fluid flow passageway and a valve seat. A bonnet assembly including a housing is mounted to the valve body. A diaphragm, a backing cushion and a resilient member are positioned between the bonnet assembly and the valve body. The resilient member is sandwiched between the housing of the bonnet assembly and the backing cushion for urging the backing cushion toward the diaphragm, thereby urging the diaphragm against the valve body.

16 Claims, 7 Drawing Sheets

SEALING ARRANGEMENT FOR A DIAPHRAGM VALVE

CROSS-REFERENCE TO RELATED APPLICATION

This patent application claims priority to U.S. Patent Application No. 61/231,472, filed Aug. 5, 2009, which is incorporated by reference herein in its entirety.

FIELD OF THE INVENTION

The present invention relates to a sealing arrangement for a diaphragm valve.

BACKGROUND OF THE INVENTION

FIGS. 1 and 2 depict a conventional diaphragm valve 10. The valve 10 generally includes a valve body 12 defining a fluid flow passageway 14. A weir 16, which also referred to in the art as a valve seat, is positioned within the fluid passageway 14 for cooperating with a diaphragm 18 to control the flow of fluid through the fluid passageway 14. In the fully open configuration depicted in FIG. 1, the distance separating the diaphragm 18 and the weir 16 is at its maximum to permit fluid flow through the valve. In the closed configuration depicted in FIG. 2, the diaphragm 18 bears on the weir 16 to prevent fluid flow through the valve 10.

A bonnet assembly 20 is mounted to an opening 22 defined in the valve body 12. The bonnet assembly 20 generally includes a housing 21 and a threaded valve stem 24 threadedly engaged with a threaded hole provided in the housing 21. A compressor 26 is retained on one end of the valve stem 24, and a handwheel 28 is mounted to the opposite end of the valve stem 24.

A tube nut 32 is captivated between the valve stem 24 and the compressor 26. A threaded stud 30 is provided on the top side 23 of the diaphragm 18 for threaded coupling with a threaded aperture that is formed in the tube nut 32. The threaded stud 32 passes through a hole disposed in a backing cushion 37. The backing cushion 37 is sandwiched between the diaphragm 18 and a flange 31 of the bonnet housing 21.

The handwheel 28 is rotatably coupled to an opposing end of the valve stem 24 for rotating the valve stem 24 to translate the central portions of the diaphragm 18 and the backing cushion 37 in either an upward or downward direction with respect to the weir 16 for either restricting or permitting fluid flow through the valve 10.

The diaphragm 18 and the backing cushion 37 are sandwiched together between the flanges of the valve body 12 and the bonnet 20. A set of bolts 38 join valve body 12 and the bonnet 20 together and maintain the diaphragm 18 and the backing cushion 37 in a state of compression to create a fluid tight seal at the interface between the flange 39 of the valve body 12 and the diaphragm 18. The diaphragm 18, which is composed of plastic, includes a circumferential sealing gland 33 that is positioned in contact with the flange 39 of the valve body 12.

The fluid-tight seal maintained between the flange 39 of the valve body 12 and the diaphragm 18 may be commonly referred to in the art as a perimeter seal. Ordinarily, the strain energy of the backing cushion 37 maintains adequate sealing pressure at the perimeter seal. Conventional backing cushions, which are composed of rubber or other elastomeric material, deteriorate over time due to thermal cycling. As the backing cushion deteriorates, the pressure exerted by the diaphragm against the valve body decreases, thereby increasing the potential for either fluid leakage at the perimeter seal or the introduction of contaminants into the valve through the perimeter seal. Accordingly, there exists a need to improve upon the sealing performance of a diaphragm valve at the perimeter seal.

SUMMARY OF THE INVENTION

A diaphragm valve is disclosed. According to one aspect of the invention, the diaphragm valve includes a valve body including a housing defining a fluid flow passageway and a valve seat. A bonnet assembly including a housing is mounted to the valve body. A diaphragm, a backing cushion and a resilient member are positioned between the bonnet assembly and the valve body. The resilient member is sandwiched between the housing of the bonnet assembly and the backing cushion for urging the backing cushion toward the diaphragm, thereby urging the diaphragm against the valve body to ensure a consistent perimeter seal.

According to another aspect of the invention, a diaphragm valve includes a valve body including a housing defining a fluid flow passageway and a valve seat. A bonnet assembly includes a housing mounted to the valve body. A diaphragm and a resilient member are positioned between the bonnet assembly and the valve body, wherein the resilient member is positioned to urge the diaphragm against the valve body.

BRIEF DESCRIPTION OF THE DRAWINGS

The invention is best understood from the following detailed description when read in connection with the accompanying drawings. Included in the drawings are the following figures.

DETAILED DESCRIPTION OF THE DRAWINGS

Exemplary features of selected embodiments of this invention will now be described with reference to the figures. It will be appreciated that the spirit and scope of the invention are not limited to the embodiments selected for illustration. It is contemplated that any of the exemplary configurations and materials and sizes described hereafter can be modified within the scope of this invention.

Figure 1:
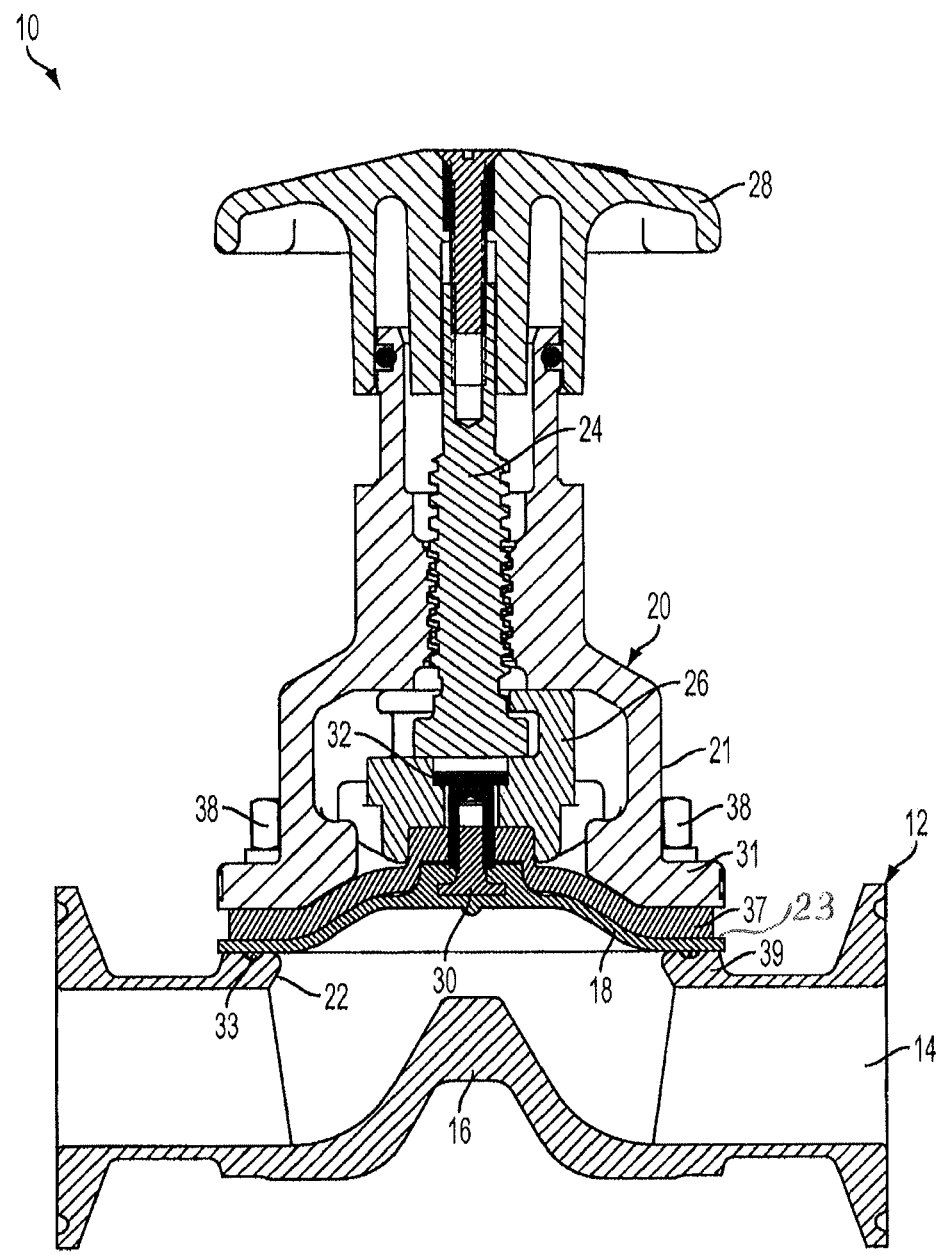
FIG. 1 depicts an cross-sectional view of a conventional diaphragm valve in a fully open configuration.
Figure 2:
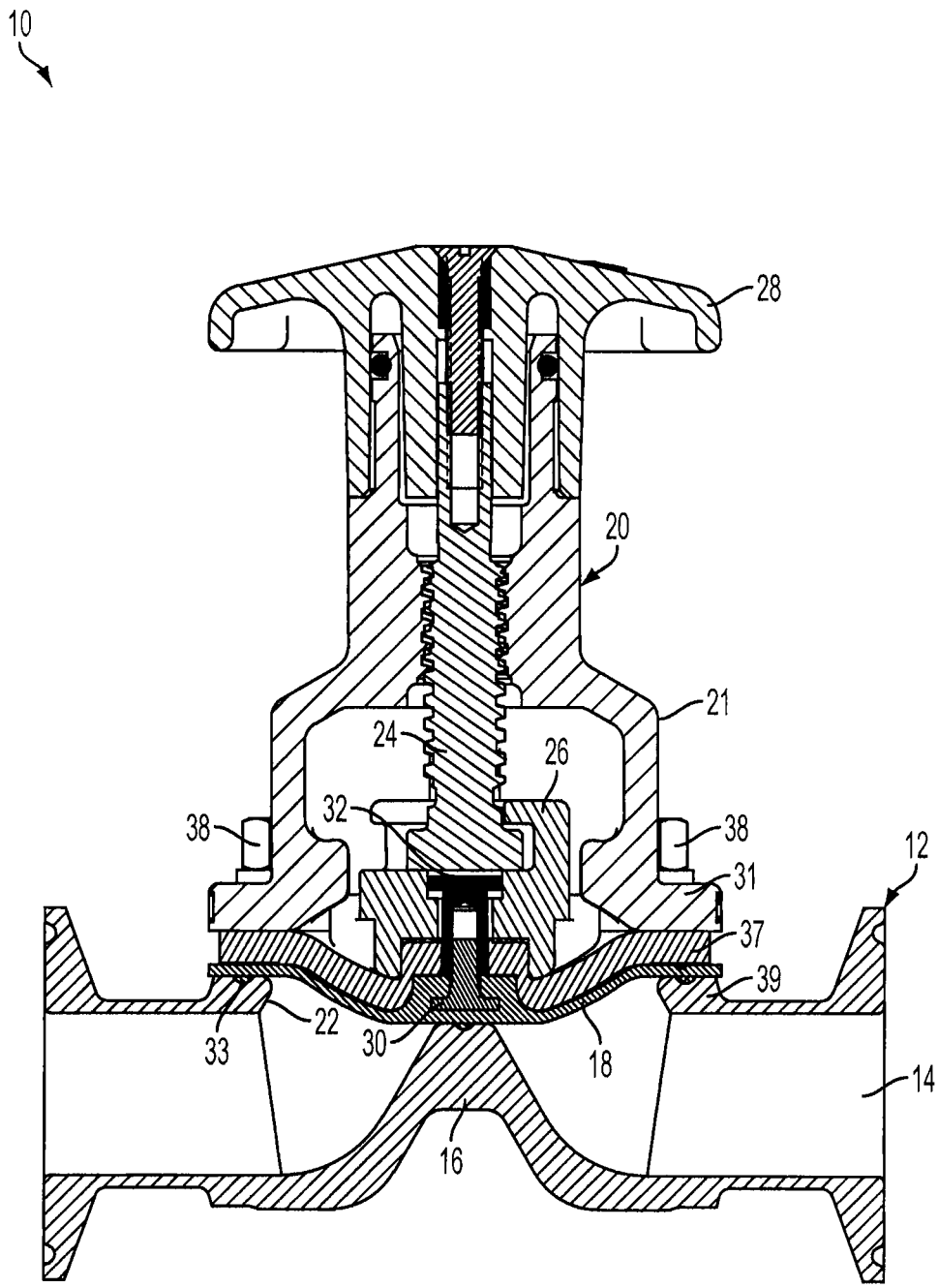
FIG. 2 depicts the conventional diaphragm valve of FIG. 1 in a closed configuration
Figure 3:
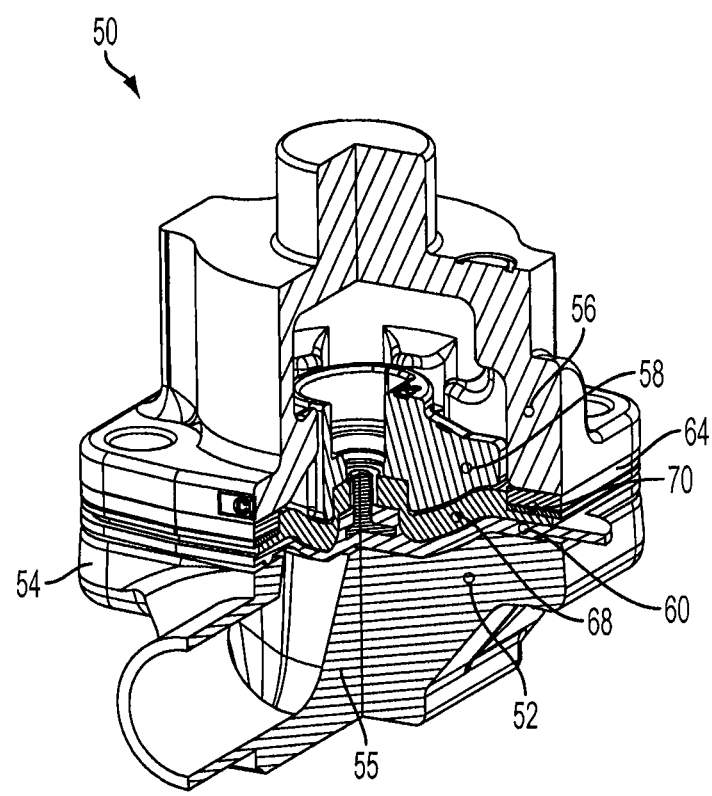
FIG. 3 depicts a cross-sectional perspective view of a diaphragm valve according to a first exemplary embodiment of the invention.
Figure 4:
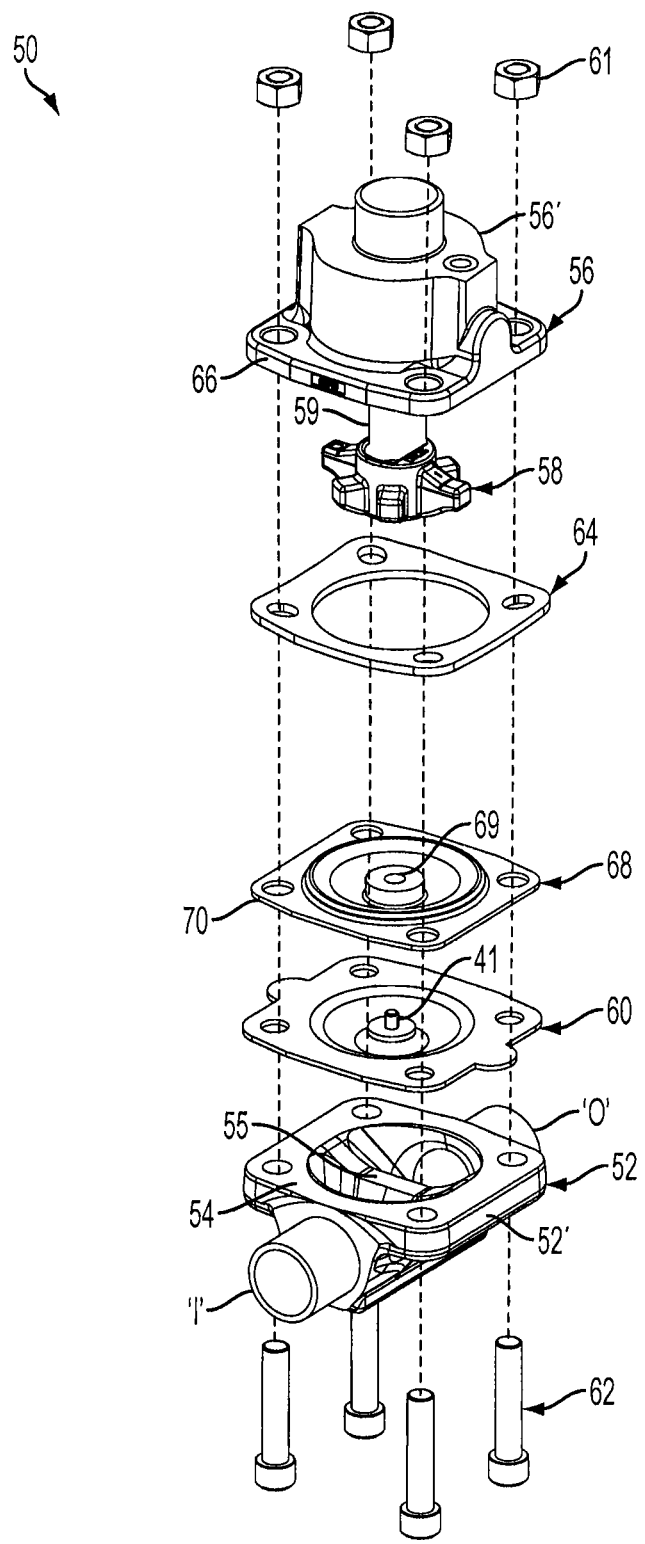
FIG. 4 is an exploded view of the diaphragm valve of FIG. 3.

FIGS. 3 and 4 depict a diaphragm valve 50 according to a first exemplary embodiment of the invention. The diaphragm valve 50 is similar to the diaphragm valve 10 of FIG. 1, with several exceptions. Like the valve 10, the diaphragm valve 50 generally comprises a valve body 52 mounted to a bonnet assembly 56. The valve body 52 includes a housing 52' defining a fluid flow passageway and a weir 55 defined in a fluid flow passageway between an inlet 'I' and an outlet 'O' (the inlet and the outlet may be switched). The bonnet assembly 56 includes a housing 56', a translatable valve stem 59 positioned within the housing 56' and a compressor 58 coupled to an end of the valve stem 59 by a tube nut (not shown). The valve stem 59 is coupled to a diaphragm 60 and a backing cushion 68 by a tube nut (not shown) and a threaded stud 41 that protrudes from a top surface of the diaphragm 60. The backing cushion 68 includes a central aperture 69 through which the stud 41 passes.

Unlike valve 10, however, the diaphragm 60, the backing cushion 68 and a resilient member 64 are positioned at the interface of the housing 52' of the valve body 52 and the housing 56' of the bonnet assembly 56. The resilient member 64 and the backing cushion 68 compensate for differences in the coefficient of thermal expansion between the diaphragm 60 and the fasteners 62 that mount the valve body 52 to the bonnet assembly 56.

The resilient member 64 is sandwiched between a flange 66 of the bonnet 56 and a reduced-thickness portion 70 of the backing cushion 68. The reduced-thickness portion 70 of the backing cushion 68 is sandwiched between the diaphragm 60 and the resilient member 64. The diaphragm 60 is sandwiched between the reduced-thickness portion 70 of the backing cushion 68 and the flange 54 of the valve body 52 to form a perimeter seal at the mating surface of the top flange 54.

The diaphragm 60, resilient member 64, and the backing cushion 68 include apertures at each of their corners to accommodate four fasteners 62. The fasteners 62, in the form of threaded bolts and mating nuts 61, join the bonnet 56 and the valve body 52 together to maintain the diaphragm 60, the backing cushion 68, and the resilient member 64 in a state of compression, thereby maintaining a fluid tight seal at the perimeter seal between the valve body 52 and the diaphragm 60. Alternatively, the bonnet assembly 56 and the valve body 52 may be mounted together by one or more clamps or a tri-clamp system, for example.

The resilient member 64 is configured to maintain adequate sealing pressure at the perimeter seal, which is located at the interface between the diaphragm 60 and the flange 54 of the valve body 52. As the backing cushion 68, which is composed of rubber, deteriorates over time, the resilient member 64 expands to maintain a substantially constant pressure at the perimeter seal, thereby preventing both fluid leakage and the introduction of contaminants at the interface between the diaphragm 60 and the flange 54 of the valve body 52.

The elastomeric diaphragm 60 and the elastomeric backing cushion 68 are both composed of an elastomeric material, such as rubber. The resilient member 64 may be provided in the form of a metallic preloaded Belleville washer (as shown in FIGS. 3-7), one or more springs, a wave spring, or an elastomeric/polymer spring, for example. Unlike the elastomeric backing cushion of FIG. 1, however, the resilient member 64 resists deterioration at the upper limit of service temperature of the valve 50 (e.g., 300 degrees Fahrenheit). Those skilled in the art will understand that the resilient member 64 may have alternate forms without departing from the scope or spirit of the invention.

According to another exemplary embodiment of the invention, the backing cushion is not sandwiched between the diaphragm 60 and the resilient member 64. In that embodiment, the resilient member 64 bears directly on the top side of the diaphragm 60.

Figure 5:
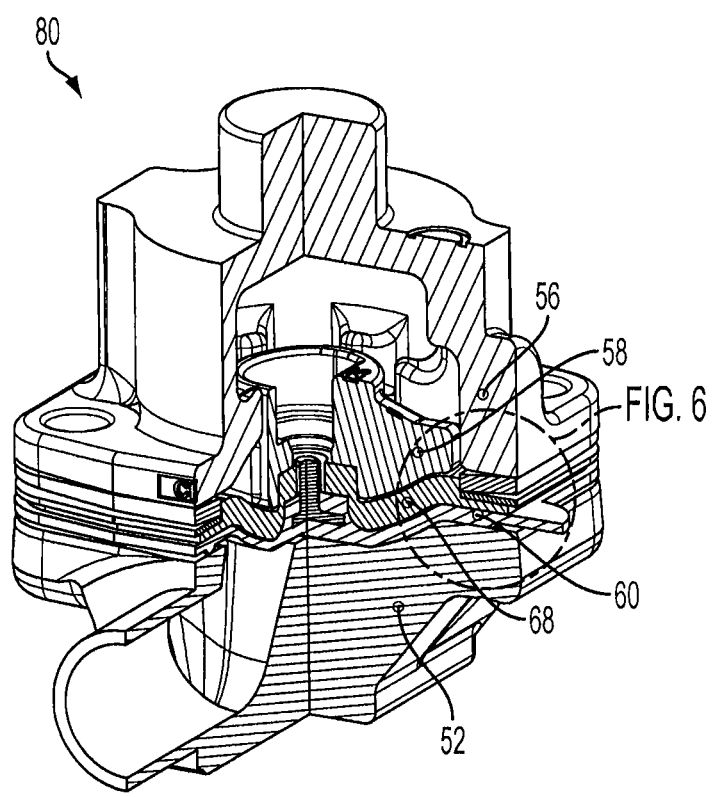
FIG. 5 depicts a cross-sectional perspective view of a diaphragm valve according to a second exemplary embodiment of the invention.
Figure 6:
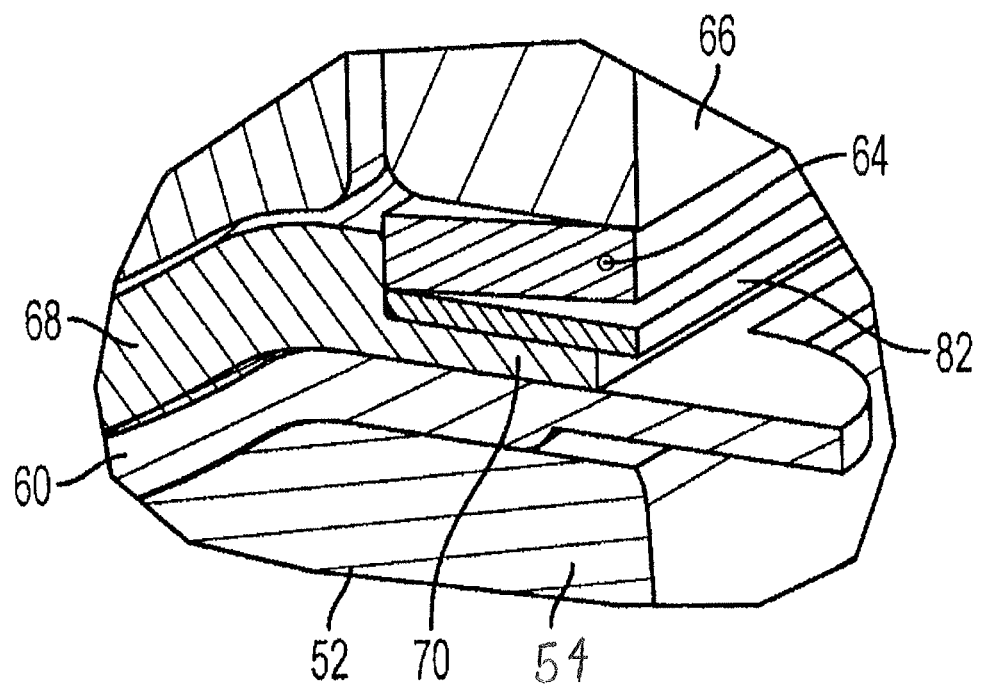
FIG. 6 is a detailed view of the diaphragm valve of FIG. 5.
Figure 7:
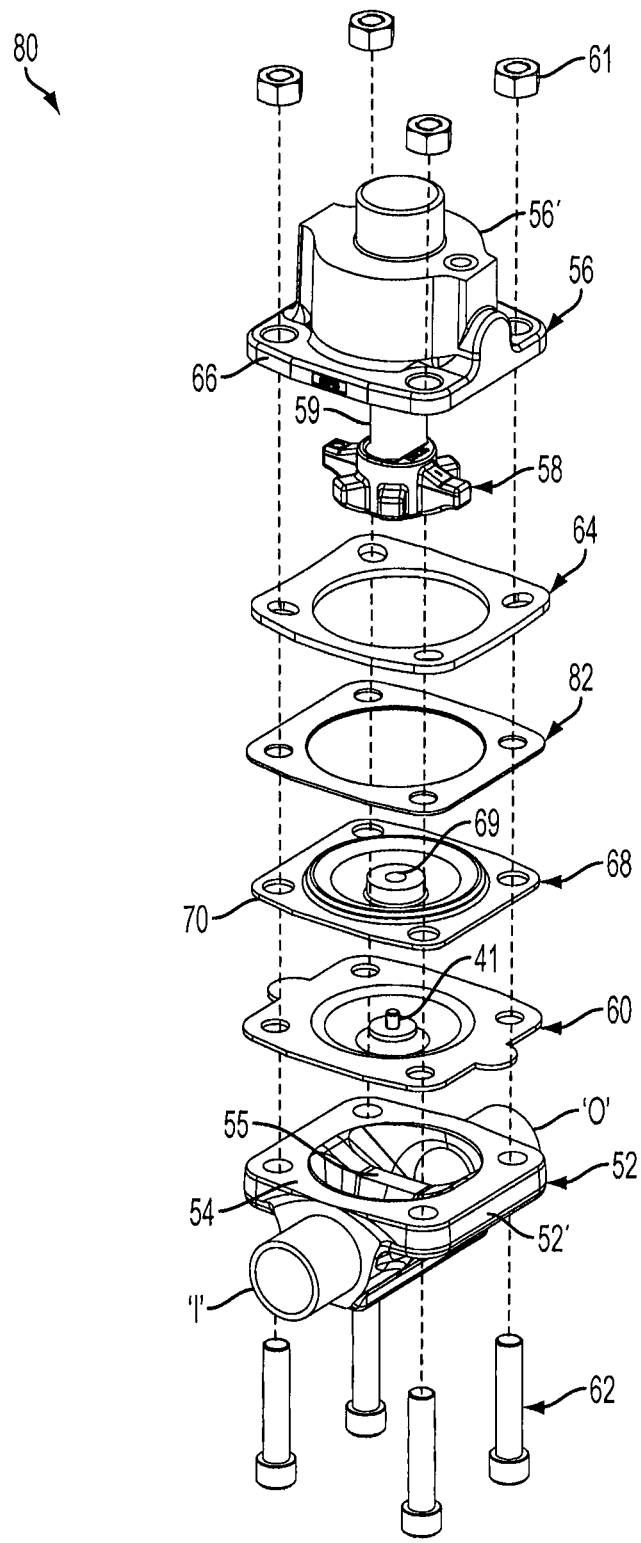
FIG. 7 is an exploded view of the diaphragm valve of FIG. 5.

FIGS. 5-7 depict a diaphragm valve 80 according to another exemplary embodiment of the invention. The diaphragm valve 80 is substantially similar to the diaphragm valve 50 of FIG. 6, with the exception that a spacer plate 82 is sandwiched between the reduced-thickness portion 70 of the backing cushion 68 and the resilient member 64. The spacer plate 82 is provided to evenly distribute the force applied by the resilient member 64 along the entire top surface of the reduced-thickness portion 70 of the backing cushion 68.

In an assembled form of the valve 80, the loaded resilient member 64 applies pressure against the spacer plate 82. In turn, the spacer plate 82 applies pressure against the reduced-thickness portion 70 of the backing cushion 68. That pressure is then transferred to the diaphragm 60, thereby continuously re-establishing the perimeter seal as the backing cushion 68 deteriorates over time. As best shown in FIG. 7, the resilient member 64 and the spacer plate 82 include central apertures through which the compressor 58 passes. The spacer plate 82 also includes apertures at its corners to accommodate the fasteners 62. The spacer plate 82 may be composed of a metallic material, a polymeric material or an elastomeric material.

Although this invention has been described with reference to exemplary embodiments and variations thereof, it will be appreciated that additional variations and modifications can be made within the spirit and scope of this invention.

What is claimed:

1. A diaphragm valve comprising:
   a valve body including a housing defining a fluid flow passageway and a valve seat;
   a bonnet assembly including a housing mounted to the valve body; and
   a diaphragm, a backing cushion and a metallic spring that are each positioned between the bonnet assembly and the valve body,
   wherein the metallic spring is sandwiched between the housing of the bonnet assembly and the backing cushion for urging the backing cushion toward the diaphragm, thereby urging the diaphragm against the valve body, and biasing the valve body away from the bonnet assembly,
   wherein the metallic spring is separate from the valve body and the bonnet assembly and is positioned between mating flanges of the valve body and the housing of the bonnet assembly.

2. The diaphragm valve of claim 1 further comprising a spacer plate positioned between the metallic spring and the backing cushion for evenly distributing a load applied by the metallic spring onto the backing cushion.

3. The diaphragm valve of claim 2, wherein a reduced thickness portion of the backing cushion is sandwiched between the spacer plate and the diaphragm.

4. The diaphragm valve of claim 1, wherein the metallic spring is a Belleville washer.

5. The diaphragm valve of claim 1, wherein a reduced thickness portion of the backing cushion is sandwiched between the metallic spring and the diaphragm.

6. The diaphragm valve of claim 1, wherein said bonnet assembly further comprises an adjustable valve stem positioned within the housing, and a compressor mounted to an end of the valve stem.

7. The diaphragm valve of claim 6, wherein the compressor is configured to bear on a surface of the diaphragm.

8. The diaphragm valve of claim 1, wherein the backing cushion is composed of rubber.

9. The diaphragm valve of claim 1, wherein the resilient metallic spring is preloaded.

10. The diaphragm valve of claim 1, wherein the metallic spring compensates for differences in thermal expansion between the diaphragm and a fastener that mounts the valve body to the bonnet assembly.

11. A diaphragm valve comprising:
a valve body including a housing defining a fluid flow passageway and a valve seat;
a bonnet assembly including a housing mounted to the valve body; and
a diaphragm and a metallic spring that are each positioned between the bonnet assembly and the valve body, wherein the metallic spring is positioned to urge the diaphragm against the valve body, and bias the valve body away from the bonnet assembly,
wherein the metallic spring is separate from the valve body and the bonnet assembly and is positioned between mating flanges of the valve body and the housing of the bonnet assembly.

12. The diaphragm valve of claim 11, wherein the resilient metallic spring is composed of a metallic material.

13. The diaphragm valve of claim 11, wherein the metallic spring is a Belleville washer.

14. The diaphragm valve of claim 11, wherein the metallic spring is preloaded.

15. The diaphragm valve of claim 11, wherein the metallic spring compensates for differences in thermal expansion between the diaphragm and a fastener that mounts the valve body to the bonnet assembly.

16. The diaphragm valve of claim 11 further comprising a spacer plate positioned between the metallic spring and the diaphragm for evenly distributing a load applied by the metallic spring onto the diaphragm.

* * * * *